(12) United States Patent
Delzeit (10) Patent No.: US 7,288,490 B1
(45) Date of Patent: *Oct. 30, 2007

(54) INCREASED ALIGNMENT IN CARBON NANOTUBE GROWTH

(75) Inventor: Lance D. Delzeit, Sunnyvale, CA (US)

(73) Assignee: United States of America as Represented by the Administrator of the National Aeronautics and Space Administration (NASA), Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 11/009,854

(22) Filed: Dec. 7, 2004

(51) Int. Cl.
*H01L 21/31* (2006.01)

(52) U.S. Cl. ................... 438/758; 438/765; 438/770; 438/771; 977/742; 257/E21.128; 257/E51.04

(58) Field of Classification Search ............... 438/758, 438/765, 769, 770, 771; 977/742; 257/E21.128, 257/E51.04
See application file for complete search history.

(56) References Cited

U.S. PATENT DOCUMENTS 6,858,197 B1 * 2/2005 Delzeit .................... 423/447.3

2004/0046539 A1 * 3/2004 Rhoads ........................ 323/355
2004/0150865 A1 * 8/2004 Chen et al. .................. 359/252
2004/0211271 A1 * 10/2004 Han et al. ................... 73/866.5
2005/0112048 A1 * 5/2005 Tsakalakos et al. ......... 423/439

* cited by examiner

*Primary Examiner*—Matthew Smith
*Assistant Examiner*—Su C. Kim
(74) *Attorney, Agent, or Firm*—John F. Schipper; Robert M. Padilla (57) ABSTRACT

Method and system for fabricating an array of two or more carbon nanotube (CNT) structures on a coated substrate surface, the structures having substantially the same orientation with respect to a substrate surface. A single electrode, having an associated voltage source with a selected voltage, is connected to a substrate surface after the substrate is coated and before growth of the CNT structures, for a selected voltage application time interval. The CNT structures are then grown on a coated substrate surface with the desired orientation. Optionally, the electrode can be disconnected before the CNT structures are grown.

19 Claims, 11 Drawing Sheets

INCREASED ALIGNMENT IN CARBON NANOTUBE GROWTH

FIELD OF THE INVENTION

This invention relates to control of alignment in growth of carbon nanotubes.

BACKGROUND OF THE INVENTION

In 1991, S. Iijima (Nature, vol. 354 pp. 56-58) reported growth of multi-wall coaxial nanotubes, containing 2-50 layers with radial separations of about 0.34 nm, using an arc discharge evaporation method similar to that used for Fullerene synthesis. The nanotubes originally observed by Iijima were formed on the negative voltage end of an electrode pair and were plentiful in some regions and sparse in other regions. Since that time, other workers have developed other discharge means for controlled deposition of graphitic carbon. However, it is not straightforward to discriminate between, and control the growth and alignment of, a single wall carbon nanotube ("SWCNT"), a multi-wall carbon nanotube ("MWCNT") and/or a carbon nanofiber ("CNF").

The SWCNTs, MWCNTs and CNFs potentially have many applications that rely upon the large mechanical strength and/or large electrical or thermal conductivity associated with these structures, if the alignment of such structures can be controlled. Some workers have used liquid catalysts to initiate growth of some carbon nanotubes, but alignment of a finely detailed array of such structures is difficult or impossible using a liquid.

What is needed is a system and procedure that allows one to deposit an array of SWCNTs, an array of MWCNTs, or an array of CNFs, with increased alignment on a substrate, using a single electrode to define a growth direction. Preferably, the electrode should have an applied voltage in a range 0.1-100 Volts.

SUMMARY OF THE INVENTION

These needs are met by the invention, which provides (1) separate procedures for generating and aligning growth of an array of SWCNTs, an array of MWCNTs and/or an array of CNFs, with a CNT or CNF length that depends upon the structure involved but is generally in a range 1-100 µm. In one embodiment, an array of SWCNTs is grown by providing a substrate, coated on a first substrate surface with an optional first thickness (preferably at least 1-10 nm) of a metal underlayer (e.g., Al or Ir or a mixture thereof) and coated with a second thickness (preferably at least 0.1-5 nm) of one or more active catalysts (e.g., Fe, Co, Ni, Mo and/or Pd, or a mixture thereof). An electrode having an associated voltage magnitude in a range 0.1-100 Volts, or higher (up to $10^6$ Volts if a Tesla coil is used), relative to a voltage associated with the catalyst layer, is connected to the substrate first surface or to a substrate second surface for a time interval of selected length in a range 1-100 sec, or higher if desired, preferably at least 5 sec in length. In a first alternative, the electrode is then removed or disconnected, In a second alternative, the electrode is allowed to remain connected.

A selected heated hydrocarbon gas (e.g., $CH_4$, $C_2H_4$, and/or $C_2H_2$) intermediate species ($C_mH_n$) is passed over the coated substrate to successively strip the H atoms and deposit the carbon particles on the catalyst. Optionally, the underlayer includes a first sub-underlayer and a second sub-underlayer with different materials. For an SWCNT array, the preferred gas is $CH_4$ and the preferred temperature range is 800-1100° C. (more preferably, T≈900° C.) For a MWCNT array, the preferred gas is $C_2H_4$ or $C_2H_2$, the preferred temperature range is 650-900° C. (more preferably, T≈750° C.). An underlayer of Al or Ir is optionally present for growth of SWCNTs, MWCNTs or CNFs. For a CNT array, a plasma discharge can be used to grow SWCNTs, MWCNTs and/or CNFs at T=400-900° C.

Connection of the electrode, even for a time interval as short as a few sec, will result in CNTs or CNFs that are oriented in substantially the same direction, roughly perpendicular to the coated substrate surface and having CNT lengths in a range 1-1000 µm. The CNT orientation occurs whether the electrode remains connected to the substrate or is disconnected from the substrate.

DESCRIPTION OF BEST MODES OF THE INVENTION

Figure 1:
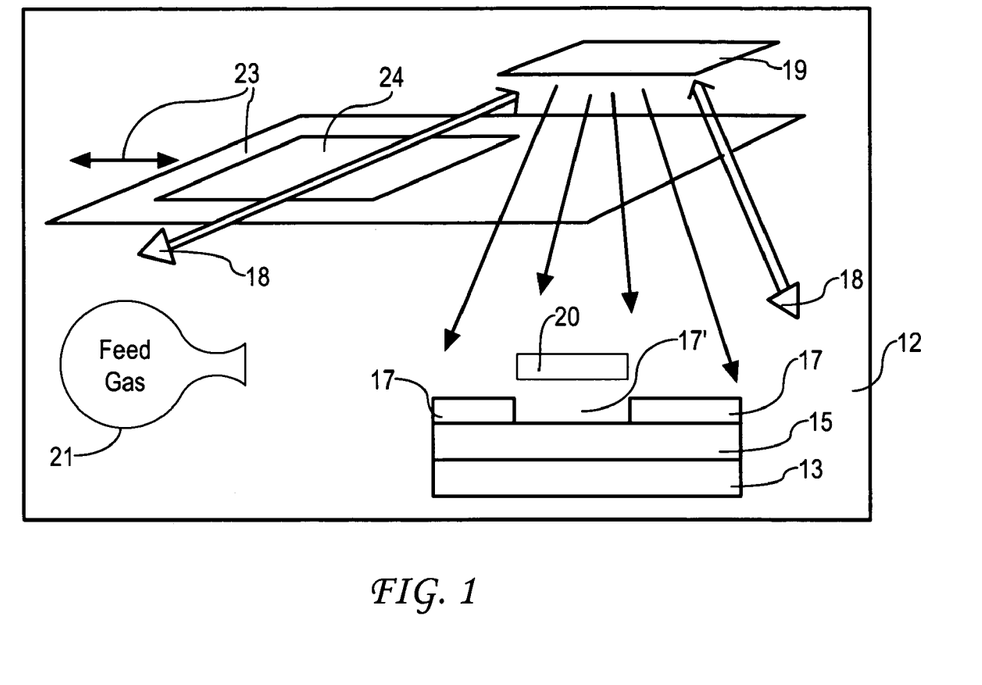
FIG. 1 illustrates a system for generating and controlling the growth of a SWCNT or a MWCNT, depending upon the choice of several parameters.

FIG. 1 illustrates a system 11 for generating and controlling patterned growth of an array of SWCNTs. A substrate 13 located in a chamber 12 is coated with a first layer 15 (optional) of a selected first metal, preferably Al and/or Ir, having a thickness of at least 1-10 nm (for Al) or 5-20 nm (for Ir). A thicker first layer can be used but does not produce any significant changes in the array thus produced. Optionally, the first layer 15 has a multi-layer structure, including a first sub-layer 15A of a metal or alloy, such as Pt, Pd, Cr, Mo, Ti and/or W, that has selected electrical conductivity properties, and a second sub-layer 15B, preferably Al (thickness≧1-10 nm) or Ir (thickness≧5-20 nm), that provides a structure for a catalyst layer 17. Use of a second sub-layer 15B also allows growth of SWCNTs, MWCNTs and CNFs on a (coated) substrate that would not be compatible with the catalyst. An example is use of highly oriented pyrolytic graphite (HOPG) or amorphous carbon on the substrate. For convenient reference, the optional first layer 15 will be referred to as the "first layer," whether the structure is single-layer or multi-layer, except where details of this layer are important.

One or more ion sources 18 provides ion beams that are directed at a metal sputtering source 19 that produces particles of a selected metal, such as Fe, Co, Ni or Mo, that forms a catalyst layer 17, having a preferred thickness of 0.1-20 nm, on the first layer 15. Two or more metals can be deposited simultaneously or sequentially as part of the first layer 15 and/or the second layer 17, using a sputtering source.

If the support structure 13/15/17 is to promote a patterned array of carbon nanotubes, a mask 20 is positioned between the sputtering source 19 and the first layer 15 to prevent the catalyst layer 17 from forming at selected locations. The mask 20 creates a "shadow" on the first layer 15, preventing the catalyst layer 17 from forming and producing a "void" 17' where the catalyst material would otherwise appear.

The mask 20 can be a shadow mask that is positioned over the substrate 13 (or over the substrate 13 plus first layer 15) by the adherence of molecules to the substrate surface, with selected regions of the adherence molecules removed, as occurs with photolithography and e-beam lithography; or by the addition of other self-assembling molecules, such as proteins or lipid layers or small metal particles held in place within a biological or chemical molecule and positioned onto a surface in a two-dimensional array.

A second layer 17 thicker than 0.1-20 nm may be used here. The active catalyst may include a co-catalyst, such as a small amount of Mo in addition to the Fe, Co, Ni and/or Pd, or a mixture thereof, especially in the absence of an Al first layer 15, in order to promote a higher density of the SWCNTs in the array. The first layer 15 catalyzes the required chemical reaction(s) and may be deposited using ion beam sputtering from a first layer source 19 located adjacent to the substrate 13. The substrate may be Si, porous Si, amorphous carbon, highly oriented pyrolytic graphite (HOPG), an AFM cantilever, fused quartz, zeolite, mica, selected ceramics, selected polymers, selected metals, natural minerals or any similar material. Provision of the first layer 15 enhances electrical conductivity associated with the carbon nanotube and also helps prevent lift-off of the catalyst in the second layer 17 from the substrate 13.

In one approach, a pattern including one or more catalysts in the second layer 17 is deposited in one chamber, and the system 11 is moved to a second chamber for growth of the carbon nanotubes. In another approach, catalyst deposit and patterned carbon nanotube growth occur in the same chamber.

A feed gas source 21 within the chamber 12 (e.g., a quartz tube) provides a heated gas, such as $CH_4$ at a temperature in the range T=800-1100° C., at a selected gas flow rate, such as 1000 sccm. A relatively inert carrier gas, such as Ar or Xe or Kr or $N_2$, is optionally used to transport the heated gas across the coated support structure 13/15/17, and the coated support structure successively strips the hydrogen atoms from the heated gas to ultimately produce C particles (bare C atoms and C molecules, etc.) that are received at, and accumulate on, a portion of the coated substrate and contribute to the growth of SWCNTs, according to the catalyst pattern deposited on the substrate. If the heated gas temperature adjacent to the coated support structure 13/15/17 drops substantially below T=800° C., for example, to T≈750° C., the growth of SWCNTs will stop. The gas $CH_4$ requires use of a relatively high temperature (T=800-1100° C.) in order to promote H atom stripping to produce substantially "bare" C atoms and molecules. The chamber temperature is then dropped to or below T≈300° C. before the coated substrate and SWCNT growth array are exposed to air.

A shutter or similar mechanism 23 and aperture 24 are positioned between the sputtering source 19 and the feed gas source 21. The shutter 23 is opened and the mask 20 is positioned when the sputtering source 19 is to be used to deposit a first layer 15 or second layer 17 of material on the substrate 13 for purposes of subsequent growth of CNTs. When this deposit has ended and the feed gas is to be admitted into the chamber 12, the shutter 23 is closed, and the guns 18 and mask 20 are removed or hidden, to protect the sputtering source and mask surfaces from deposit of carbon thereon. The sputtering procedure and the CNT growth procedure can also be carried out in separate chambers, if desired.

Provision of a first layer 15 allows deposit of a second layer that would otherwise be chemically inconsistent with, or be poisoned by, the underlying substrate or first sub-layer. Provision of the first layer, or of a sequence of sub-layers for the first layer, can also modify the electrical or thermal conductivity properties of the finished carbon nanotube array.

If the first layer 15 is omitted, the second layer thickness is no more than about 1 nm and the substrate surface is free of scratches and similar imperfections, no SWCNTs will form on the substrate coated (only) with the second layer 17. If the substrate 13 has some scratches or imperfections in a given region, a few isolated SWCNTs may grow there, even if the first layer 15 is absent. Adding the first coating layer 15, with a first layer thickness of at least 0.1 nm of Ir or of at least 0.1 nm of Al or a mixture thereof to the substrate 13, increases the density and the uniformity of growth of the SWCNTs thereon. Addition of a small amount of Mo (0.2 nm) to the second layer 17 as a co-catalyst will increase the density of SWCNTs, where the first layer includes Ir, and has no noticeable effect on density, where the first layer contains only Al. The density of SWCNTs can be controlled and ranges from isolated SWCNTs, to a discrete uniform array, to discrete thick ropes, to a dense matte of SWCNT ropes.

Figure 2:
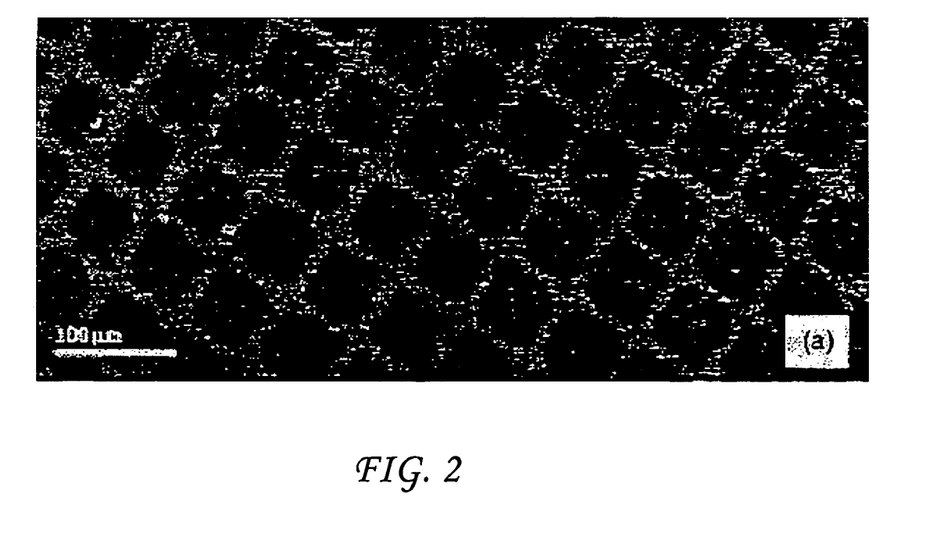
FIGS. 2 and 8A-8C are photomicrographic images of masked CNT growth.

The pattern of SWCNTs thus grown is determined by the pattern of the catalyst(s) deposited on the substrate coated with the first layer. The catalyst(s) can be deposited using ion sputtering with an Al or Ir source or can be deposited using arc discharge of a source, laser ablation of a source, chemical vapor deposition (CVD) from a suitable source, or a suitable metal evaporation method. The catalyst can be patterned using a mask with suitably detailed apertures that is pressed against the substrate 13, to provide a first layer pattern, and/or against the first layer 15, to provide a second layer pattern, before the next layer is formed. The mask pattern may be a regular or irregular array of polygonal or curvilinear apertures, such as those shown in a photomicrograph in FIG. 2 for SWCNT growth.

The diameter of SWCNTs varies from 0.9 to 2.7 nm (more generally, from 0.5 to 5 nm), and most CNTs have a diameter of about 1.3 nm. In a growth of one array of 48 SWCNTs, the diameter distribution was found to be about 10 percent at 0.9 nm, 44 percent at 1.3 nm, 29 percent at 1.8 nm, 10 percent at 2.2 nm and 6 percent at 2.7 nm. The length of an SWCNT is difficult to determine, because most SWCNTs do not have sufficient strength to support a substantial, vertically oriented tower (perpendicular to the local plane of the substrate).

Figure 3:
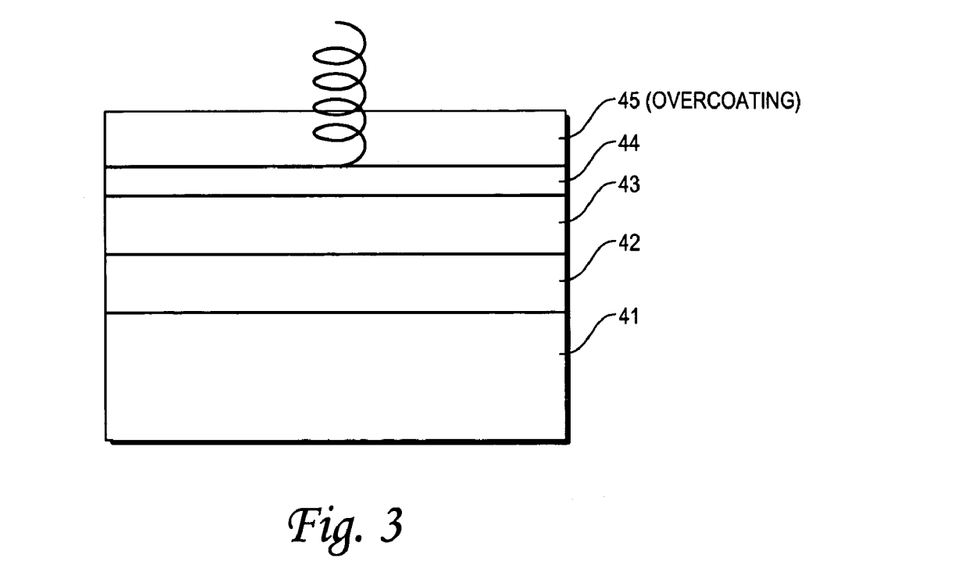
FIG. 3 schematically illustrates a four-layer structure, used to grow coated SWCNTs.

FIG. 3 schematically illustrates a five-layer support structure 40 that can also be used to grow SWCNTs. The structure 40 includes a substrate 41, a bottom layer 42 of Al (thickness≧5 nm), a second layer 43 of Fe. Co. Ni or Mo (thickness≧10 nm), a third layer 44 of Mo (thickness≧0.2 nm) and a fourth layer 45 of Al (thickness≧5 nm). Where an SWCNT is grown from the support structure 40, a portion or all of the carbon nanotube is often coated with Al. This indicates that, by providing an overcoating for a more standard four-layer structure (41/42/43/44) and choosing the overcoating material to be compatible with the growth process, coated carbon nanotubes can be grown. Overcoating materials that appear to be compatible with carbon include Al, Ga, In, Ti, Au, Ag, Zn and/or Cd.

Figure 4:
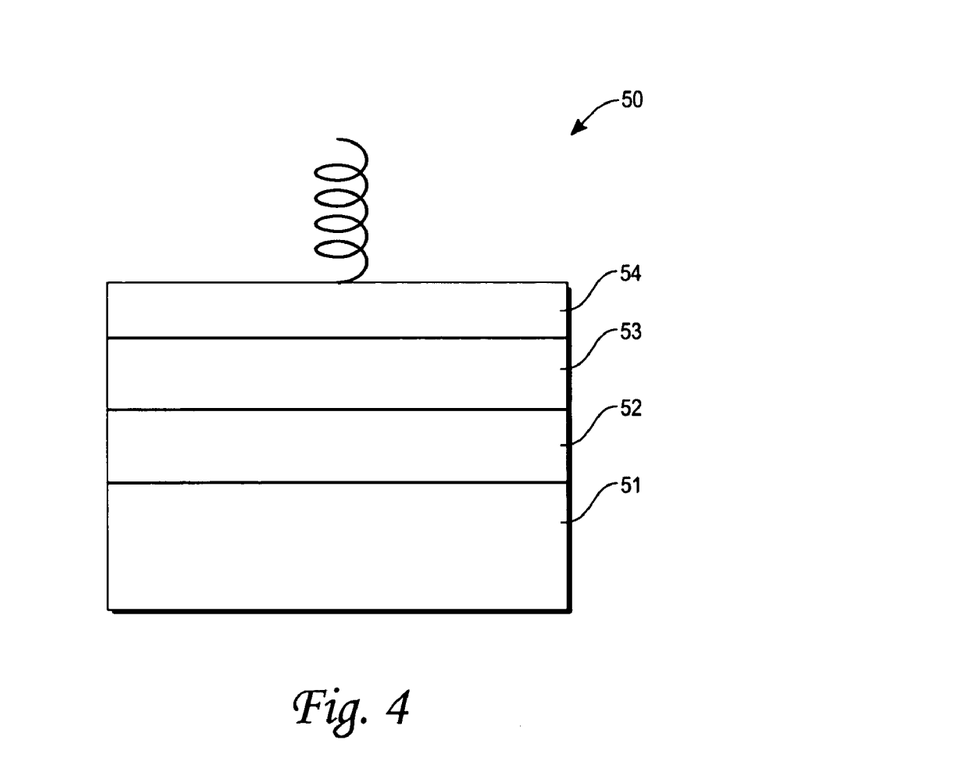
FIG. 4 schematically illustrates a structure having one, two or three layers, used to grow SWCNTs.

FIG. 4 schematically illustrates a structure 50 for growing carbon nanotubes, having a substrate 51, a first layer 52 of Pt, Pd, Cr, Mo, Ti and/or W or a material with similar structure, a second layer of Al or Ir and a third layer 53 of Fe, Co, Ni or Mo (thickness 0.1-20 nm). Where the structure 51 has the composition Pt/Al/Fe, the measured resistance of a CNF array on this structure is as low as 30 Ohms. Provision of a metal under-layer, such as Pt, Pd, Cr, Mo, Ti and/or W, dramatically lowers the electrical resistance associated with the CNF grown on such a structure.

Where a corresponding structure having one layer 52 or two layers, 52 and 53, each of thickness $\geq$10 nm, on a substrate 51 is provided, as shown schematically in FIG. 4, the measured electrical resistance is much higher. Table 1 sets forth some one-layer, two-layer and three-layer structures, each layer having thickness 10 nm, and the estimated electrical resistances across a 5 mm distance of the CNF array.

TABLE 1

Electrical Resistance Associated With A CNT Structure

| Underlying Structure | Resistance (Ohms) |
| --- | --- |
| Pt/Al/Fe | 30 |
| Pt/Fe | 50 |
| Ti/Fe | 500 |
| Al/Fe | 1,000 |
| Fe | 10,000 |

Table 1 illustrates the dramatic reduction in electrical resistance that results from provision of an underlayer of a metal or alloy, such as Pt, Pd, Cr, Mo, Ti and/or W, as part of the growth structure for a CNF array (with similar results being obtained for SWCNTs and MWCNTs).

The system 11 in FIG. 1 can also be used to generate and control the growth of a patterned array of SWCNTs and MWCNTs. For MWCNTs and CNFs, presence of a metal underlayer 15 is not required, but may be included. The substrate 13 located in the chamber 14 is optionally coated with a first layer 15 of a selected first metal, preferably Al and/or Ir, having a thickness of at least 5-20 nm. The substrate 13 and optional first layer 15 are coated with a second layer 17 of a selected catalyst, such as Fe, Co, Ni, Mo and/or Pd, having a thickness of 0.1-20 nm in a desired pattern. A thicker second layer 17 may be used here. Optionally, the active catalyst may include a co-catalyst, such as a small amount of Mo in addition to the Fe, Co, Ni and/or Pd. The first layer 15, if present, may be deposited using ion beam sputtering from a first layer source 39 located adjacent to the substrate 13, or using arc discharge, laser ablation, CVD or evaporation. The catalyst(s) in the third layer 17 is preferably provided using ion beam sputtering, arc discharge or laser ablation with a suitable catalyst source and a suitably apertured mask.

A source 21 within the chamber 14 provides a heated gas, preferably $C_2H_n$ with n=2 or 4 at a temperature in the range T=650-900° C. The heated gas moves across the coated substrate 13/15/17, which successively strips the hydrogen atoms from the heated gas to ultimately produce C particles (C atoms, C=C molecules, etc.) that are received at, and accumulate on, a portion of the coated substrate and contribute to the patterned growth of MWCNTs. If the heated gas temperature drops substantially below T=650° C., for example, to T≈600° C., the growth of MWCNTs will stop. The gas $C_2H_4$ allows use of a somewhat lower temperature (T=650-900° C.) in order to promote H atom stripping to produce C particles.

A mask in the form of a 400 mesh grid can be positioned on the coated substrate 13/15/17, and MWCNTs or SWCNTs can be grown (only) in the exposed regions (50 µm×50 µm with 10 µm grid widths, in one experiment) not covered by the grid, with sharp transitions between the exposed and masked regions, as shown in photomicrographs in FIG. 2 and FIGS. 8A-8C. Alternatively, the mask may be formed using electron beam lithography, which allows formation of sharply defined apertures on a suitable substrate, with diameters as low as 20 nm, with an increase in available pattern detail. It is estimated that as many as 4×10$^6$ SWCNTs or MWCNTs will grow in a 50 µm×50 µm growth region, using hexagonal close packing and assuming a diameter of 20 nm, and that 1-4 SWCNTs or MWCNTs will grow in a 20 nm×20 nm growth region.

Figure 5:
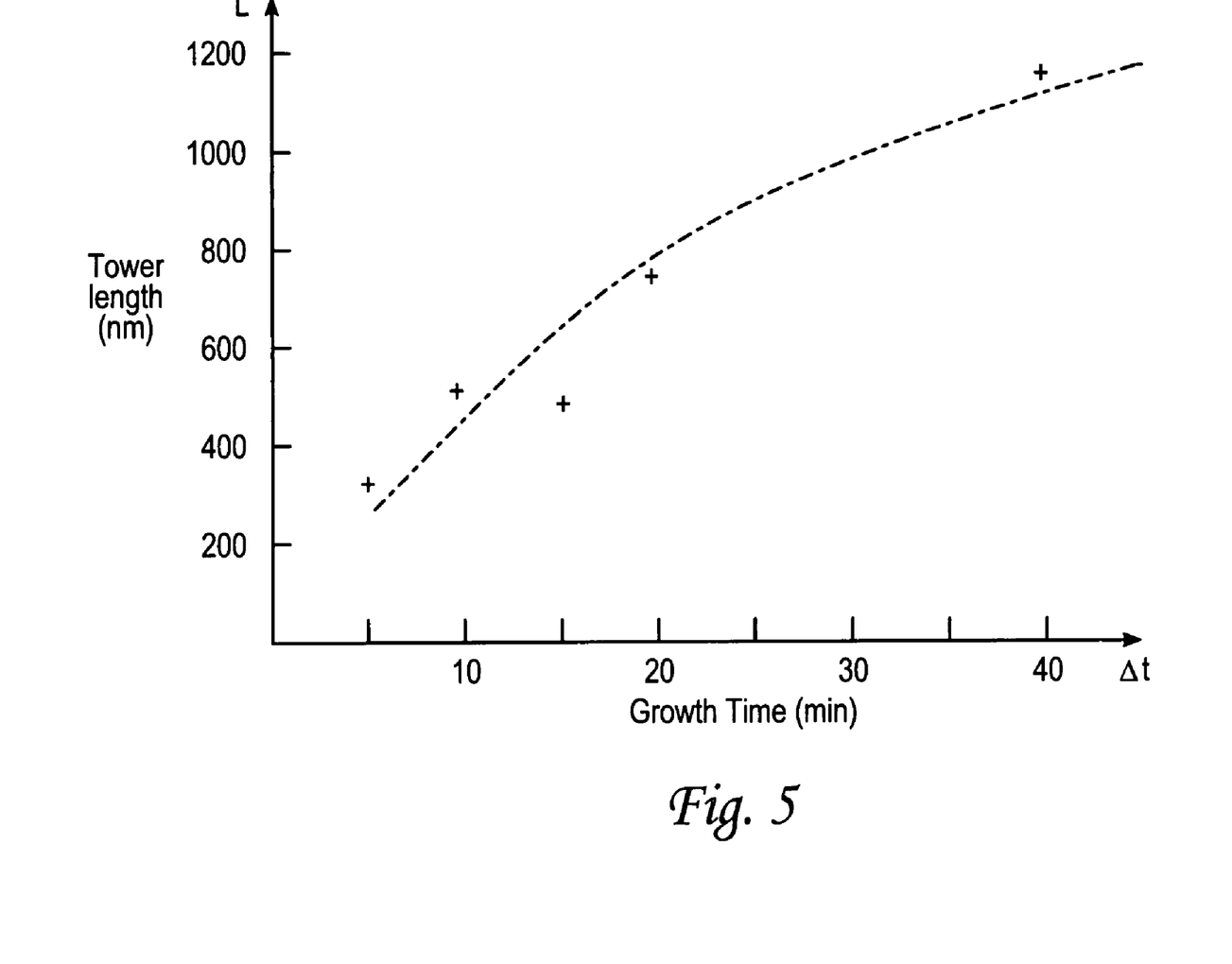
FIG. 5 graphically illustrates growth in length with time of a MWCNT.

A MWCNT or CNF may be a substantially coaxial assembly of CNTs with a diameter depending upon the number of CNT layers (e.g., 2-50) that contribute to the MWCNT. A MWCNT (or CNF) with a sufficient number of layers is self-supporting and can provide an carbon nanotube tower with a height that can be seen by an un-aided eye (e.g., 0.1-1 mm or greater). FIG. 5 graphically illustrates some measured lengths of different MWCNTs, as a function of time of growth. Not all CNTs grow at the same rate, but FIG. 5 indicates that the CNT length increases approximately as $t^\alpha$ with $\alpha<1$ (characteristic of a diffusion process) over relatively long time periods. A Ni catalyst appears to provide more uniform growth of a MWCNT than does an Fe catalyst.

A CNF has a substantially non-hollow core of graphitic carbon and is configured in one mode as a sequence of similar truncated cones of graphitic C that fit together in a substantially coaxial pattern resembling a MWCNT. Typically, a CNF has a cone angle of 10°-60°, has a diameter of 15-200 nm, and may reach a maximum height of tens to hundreds of microns or more. The feed gas used to generate a CNF is typically $CH_4$, $C_2H_4$ or $C_2H_2$ in an appropriate temperature range.

Figure 6:
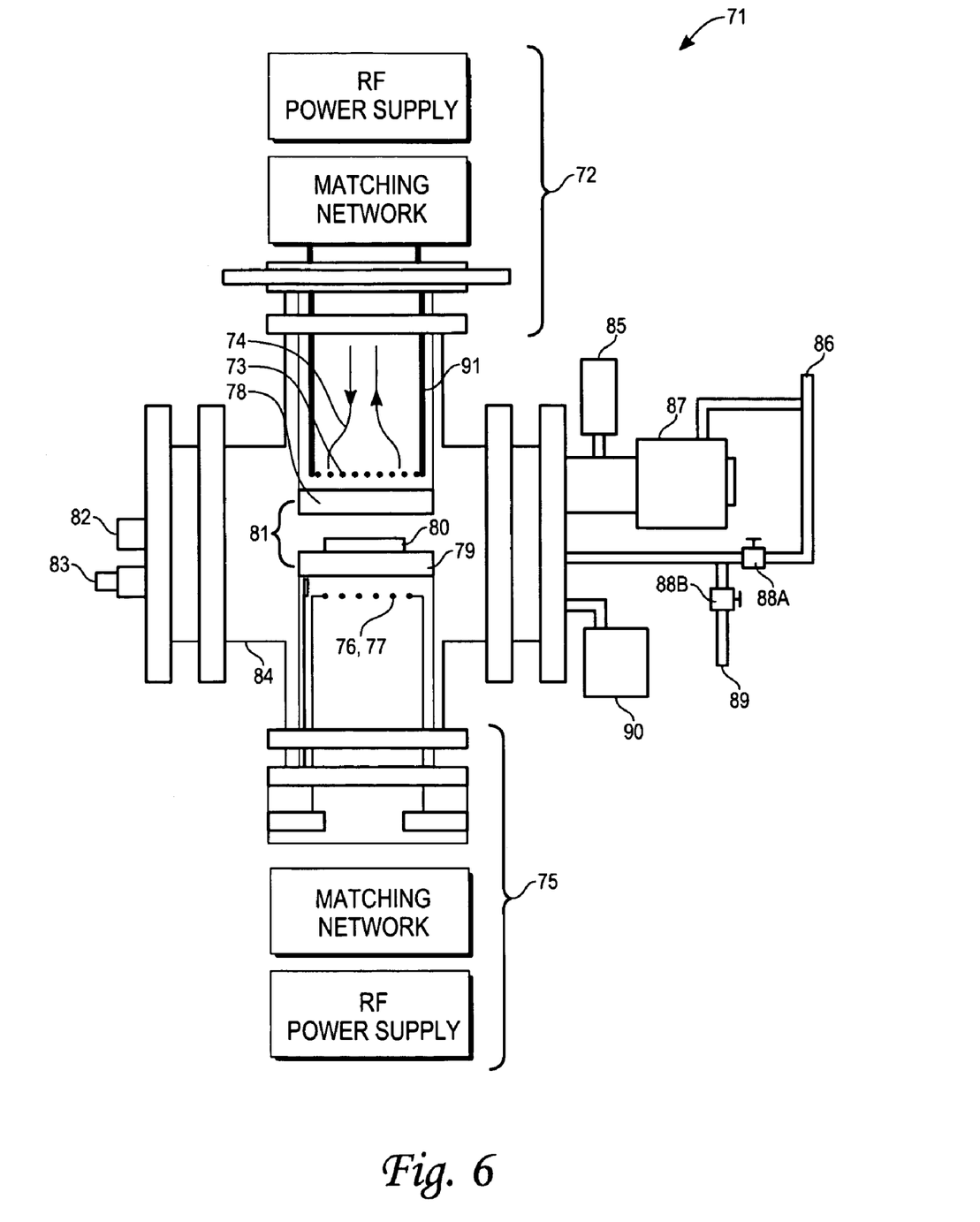
FIG. 6 illustrates plasma reactor apparatus suitable for growth of CNTs.
Figure 7A:
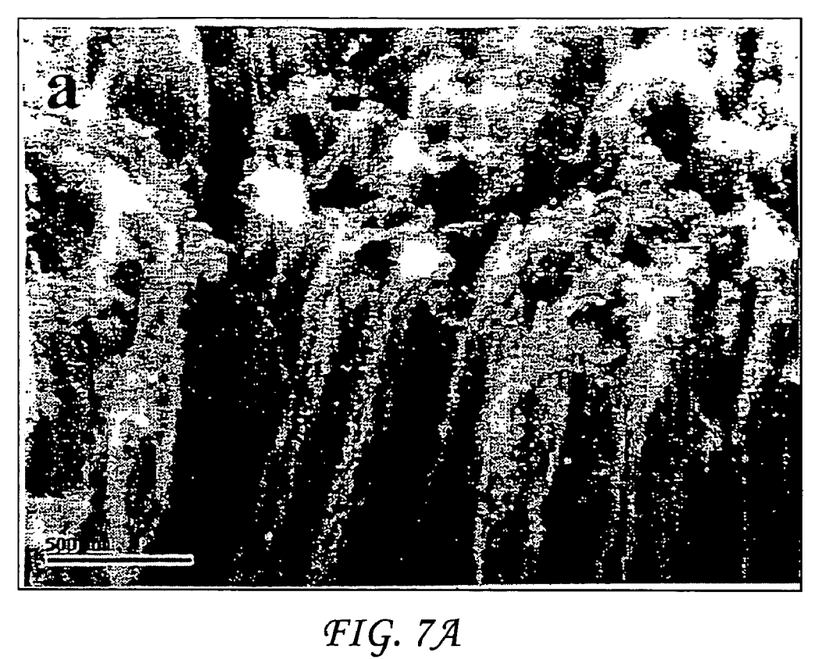
FIGS. 7A-7D are photomicrographs illustrating the effects of use of different capacitive power levels on growth of CNTs and CNFs.
Figure 7B:
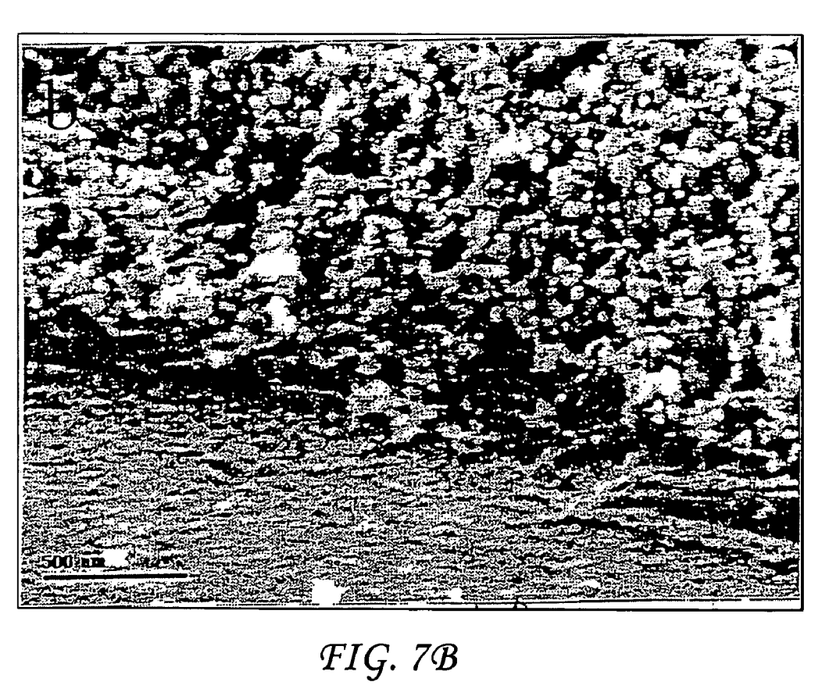
Figure 7C:
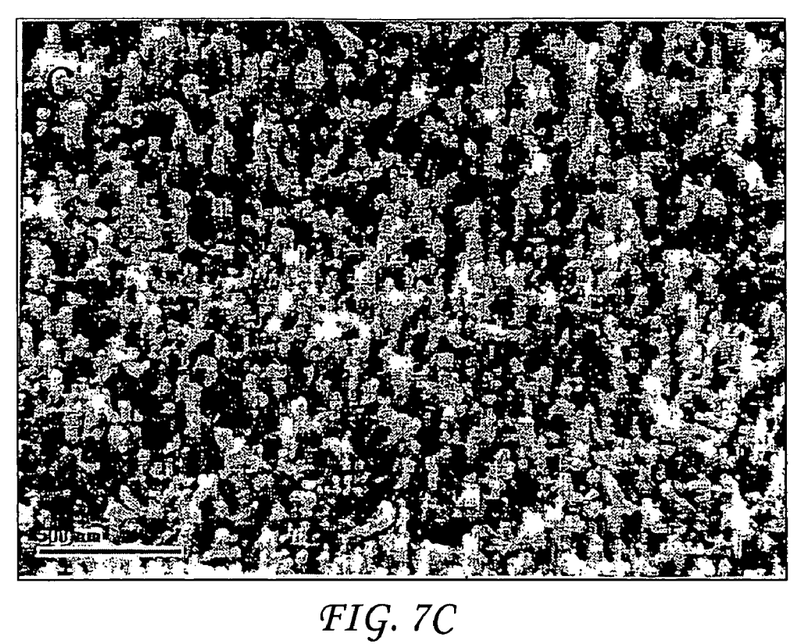
Figure 7D:
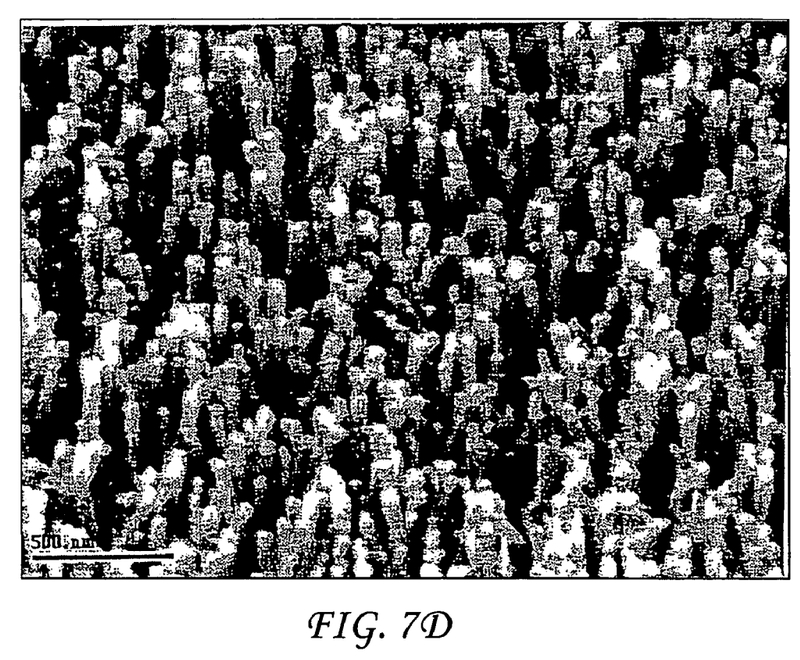

The plasma discharge system 71 in FIG. 6 includes a first power supply and matching network 72, which provides inductive power through a coil 73 (first electrode) and associated current line 74, and a second power supply and matching network 75, which provides capacitive power through the substrate stage (second electrode 79). First and second electrodes, 73 and 79, are connected to the respective first and second power supplies, 72 and 75. The structure 80 on which the CNFs are grown rests on the second electrode 79, which is spaced apart from the first electrode 73 to provide a gap region 81 in which the plasma is formed and the CNTs are grown.

The structure 80 is placed in position between the electrodes, 73 and 79, using a structure loading slot 82, and an appropriate feed gas (e.g., $CH_4$ or $C_2H_4$ or $C_2H_2$) is admitted into a reaction chamber 84 through a feed gas inlet 83. Pressure gauges, 85 and 90, measure the pressure in the plasma discharge chamber, which is pumped through the chamber 84 using a pump 86 controlled by a valve 87 and/or a first metering valve 88A. A backfill mechanism 89 provides an inert gas (e.g., Ar or Xe) that is metered by a second metering valve 88B.

In one mode of operation, the first electrode 73 includes a six-turn copper coil 73 that is inductively coupled to the plasma in the gap 81 through a Pyrex or quartz coupling window 78, held on a metal ring 91 that serves as a ground surface for the capacitively coupled second electrode 79. The second electrode 79 is about 6.25 cm in diameter and has a ground shield with 0.625 cm spacing. The second electrode is heated by a resistive coil heater 77, with temperature monitored and controlled using a thermocouple and thermocontroller. The first and second electrodes, 73 and 79, are powered by separate 13.56 MHz rf generators and matching networks, available from Advanced Energy. Feed gas is fed and controlled by an MKS 1179A mass flow controller. Feed gas pressure is measured using one of two transducers, MKS 722A and MKS 220BA, and is controlled using a manual metering valve.

The plasma initially ignites in the arms of a cross and renders the post-ignition pressure gauge measurements unreliable. In one experiment, a thin layer of Al, followed by a thin layer of Fe, is ion sputtered onto an n-doped silicon substrate. The reaction chamber 84 is continuously flushed with Ar gas (99.999 percent pure) during loading and unloading of the samples. With the substrate in place, the chamber is pumped down to $10^{-5}$ Torr and the substrate is heated to the desired temperature, allowing five minutes for temperature equilibration. A hydrogen-methane mixture is admitted and the chamber is set at the desired value, which may be in a range 0.5-20 mTorr. A nanotube growth time of 10-20 minutes is allowed, and the reactor is cooled to below 300° C. before exposure to air and removal of the sample. Optical emission spectra are collected for the feed gas, indicating the presence of $CH_4$, H and $H_2$, but the presence of species such as $CH_3$ cannot be determined because of strong absorption of the Pyrex glass in the ultraviolet region.

Plasma-enhanced CVD (PECVD) or normal CVD have been used to grow carbon CNTs on a two-layer, three-layer or four-layer structure, using various materials for the support layers, and electrical resistances have been measured for these structures. A support structure of Al/Fe/Mo, deposited using sputtering, allows CVD growth of SWCNTs having electrical resistance of about 22 kilo-ohms. Table 2 sets forth estimated resistances for MWCNTs and CNFs grown using PECVD to provide the support structure. MWCNTs and CNFs can be grown using a plasma with or without using the Al/Ir first layer shown in FIG. 1, but SWCNTs grown using a plasma may require this first layer.

PECVD can also be used to form SWCNTs and MWCNTs with a modest number (2-5) of carbon nanotube walls. SWCNT growth is normally promoted by using a thinner catalyst layer and higher growth temperatures than the catalyst thicknesses and temperatures used for growth of CNFs and MWCNTs.

In any plasma discharge, change of the temperature, the pressure, the flow rate(s), the feed gas(es) and feed gas ratios, the method of initiating the plasma, sample pretreatment, electrical bias, capacitive power, inductive power and/or catalyst will affect the type and quality of carbon nanotubes grown.

TABLE 2

Resistance Associated With PECVD-Grown MWCNTs and CNFs

| Support Structure | Resistance (Ohms) |
| --- | --- |
| Cr/Fe (MWCNT) | 345 |
| Cr/Al/Fe (CNF) | 460 |
| Pt/Al/Fe (MWCNT) | 70 |
| Ti/Fe (MWCNT) | 300 |
| W/Fe (MWCNT) | 22,000 |

TABLE 2-continued

Resistance Associated With PECVD-Grown MWCNTs and CNFs

| Support Structure | Resistance (Ohms) |
| --- | --- |
| W/Fe (CNF) | 80 |
| W/Al/Fe (MWCNT) | 50 |
| Ni (CNF) | $\geq 2,000$ |
| Fe (CNF) | 5,000 |

A CNF can be grown using a plasma discharge system 71, illustrated in one mode in FIG. 6, at somewhat lower temperatures (T=400-700° C.) with a selected capacitive power for the plasma discharge. Use of a plasma discharge allows use of lower temperatures and promotes vertically oriented CNT formation. Typically, the carbon nanotubes produced change from MWCNTs at low capacitive power to substantially all CNFs at higher capacitive power.

An inductive plasma is efficient only at sub-Torr pressures. If the chamber pressure is decreased to a low sub-Torr range, an inductive plasma can be used to grow carbon nanotubes, with a reduction in the concentration of carbon gas in the feed gas.

FIGS. 7A, 7B, 7C and 7D illustrate a transition in the carbon nanotube structure for the respective capacitive power values of 20 W, 30 W, 40 W and 50 W. At 50 W, the carbon nanotubes appear to be substantially all CNFs. Changing the inductive power level in the apparatus in FIG. 6 has little or no visible effect on the relative amounts of CNTs and CNFs grown in a plasma reactor environment.

From the results produced by "scraping" an array of MWCNTs from the coated substrate, it appears that the MWCNTs are strongly attached to the coated substrate. This attachment may be Ohmic. When the coated substrate is scraped, the MWCNT arrays appear to come off as flakes; this is consistent with a base growth pattern, as opposed to a tip growth pattern.

Figure 8A:
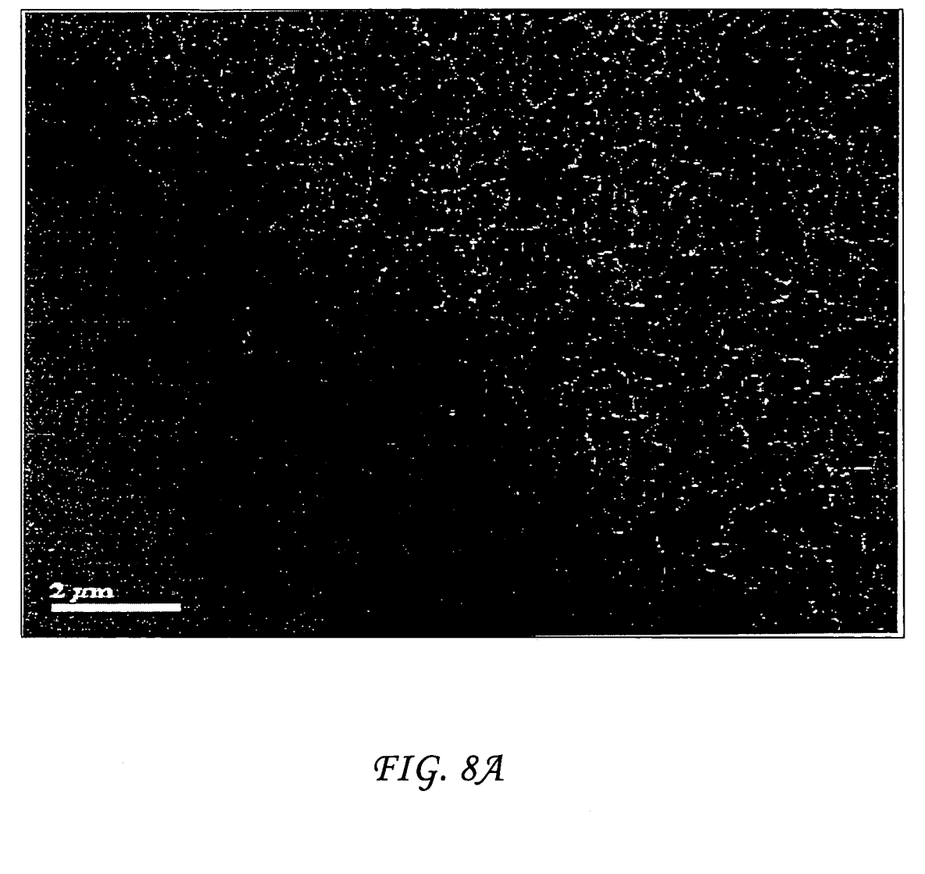
Figure 8B:
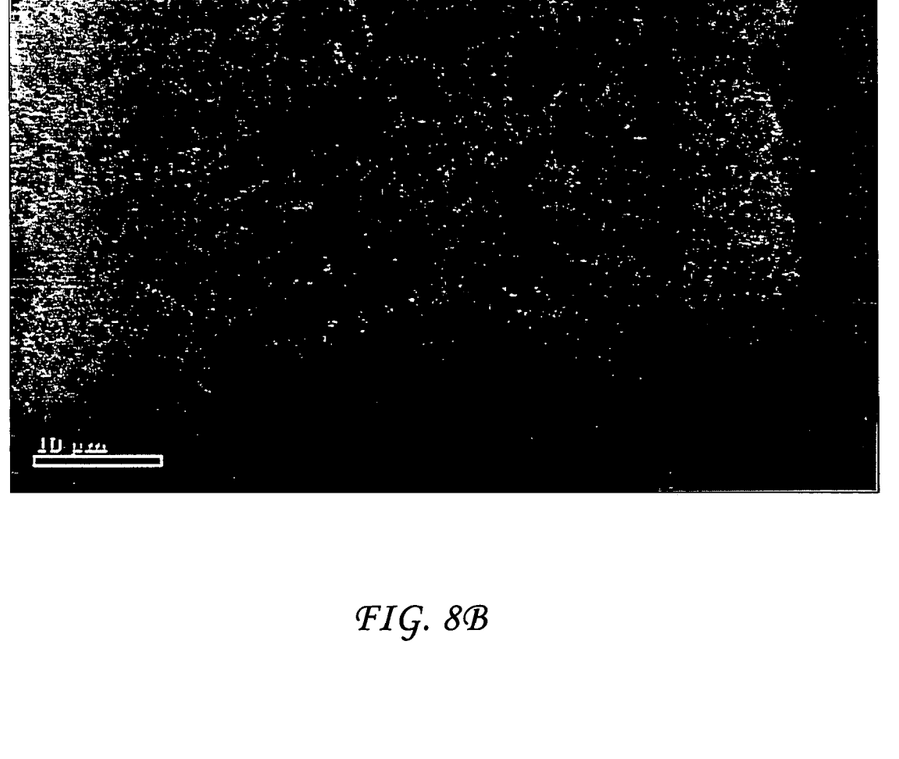
Figure 8C:
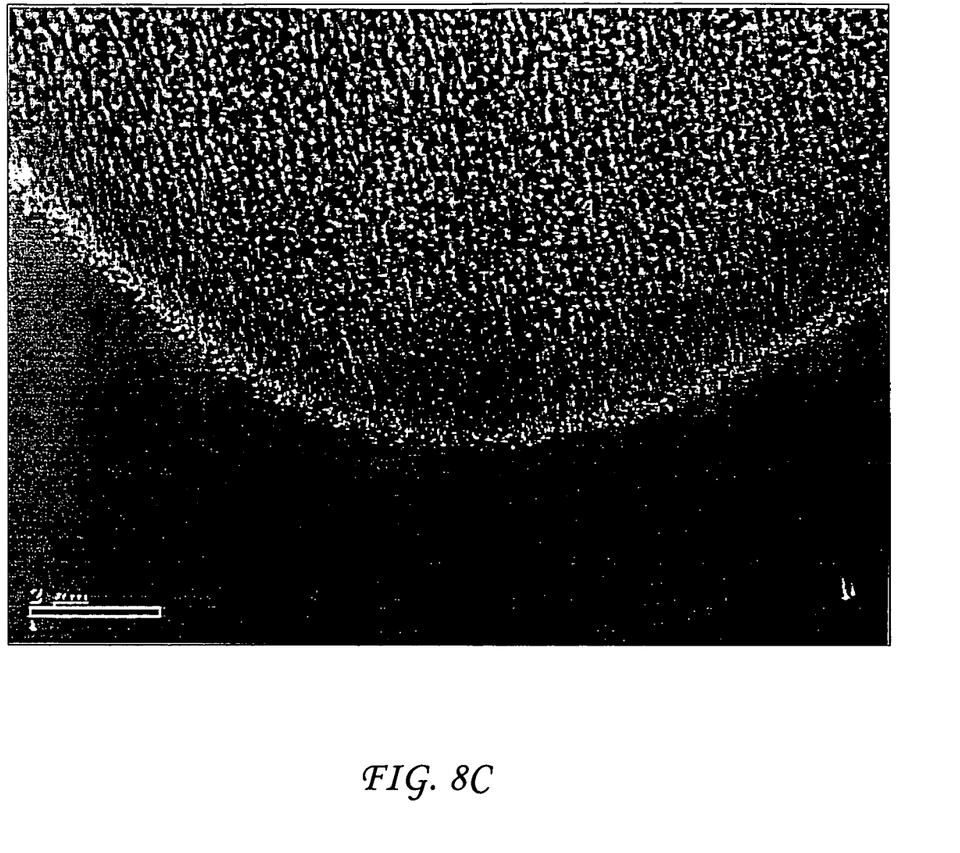

FIGS. 8A, 8B and 8C are photomicrographs showing well-defined carbon nanotube growth regions adjacent to mask edges, for an SWCNT, and MWCNT and a CNF, respectively. These images demonstrate that the (exposed) growth regions are more or less uniformly filled with carbon nanotubes and that, at a line between a growth region and a masked region, the concentration of carbon nanotubes changes abruptly from substantially zero in the masked region to a non-zero, approximately uniform value in the growth region.

Carbon nanotubes, grown on a coated surface of a substrate, can be caused or encouraged to align and grow in substantially the same direction or orientation (e.g., substantially perpendicular to a plane in the coated surface) by connecting a modest voltage source to the substrate, which serves as a single electrode. Preferably, the voltage source is connected to a second substrate surface. The voltage source may be static and may have an associated voltage of 0.0.1-100 Volts, or higher or lower, if desired. Only a single electrode is used here, and any electrical field that develops adjacent to, but outside, the substrate is negligible. A SWCNT, MWCNT or CNF, grown using a single electrode, will have a higher degree of orientation (e.g., perpendicular to the coated substrate surface), with an associated effective orientation length that can be 1-100 μm, than will a SWCNT grown without use of an electrode. The electrode is connected to the coated substrate for a selected voltage application time interval (e.g., 1-100 sec, preferably at least 5 sec), and the CNT array is then grown on the coated substrate.

Optionally, the applied voltage source may be disconnected or reduced in magnitude after the voltage application time ends. The CNT orientation effect will persist, irrespective of connection or disconnection of the voltage source during the actual CNT growth process.

The unusual effectiveness of connection of a single electrode to the coated substrate may arise through a change in the morphology of the underlayer coating and/or a change in the morphology of the catalyst layer coating. However, knowledge of the reason for, or source of, the CNT orientation effect is not required for application and utilization of this effect.

Figure 9:
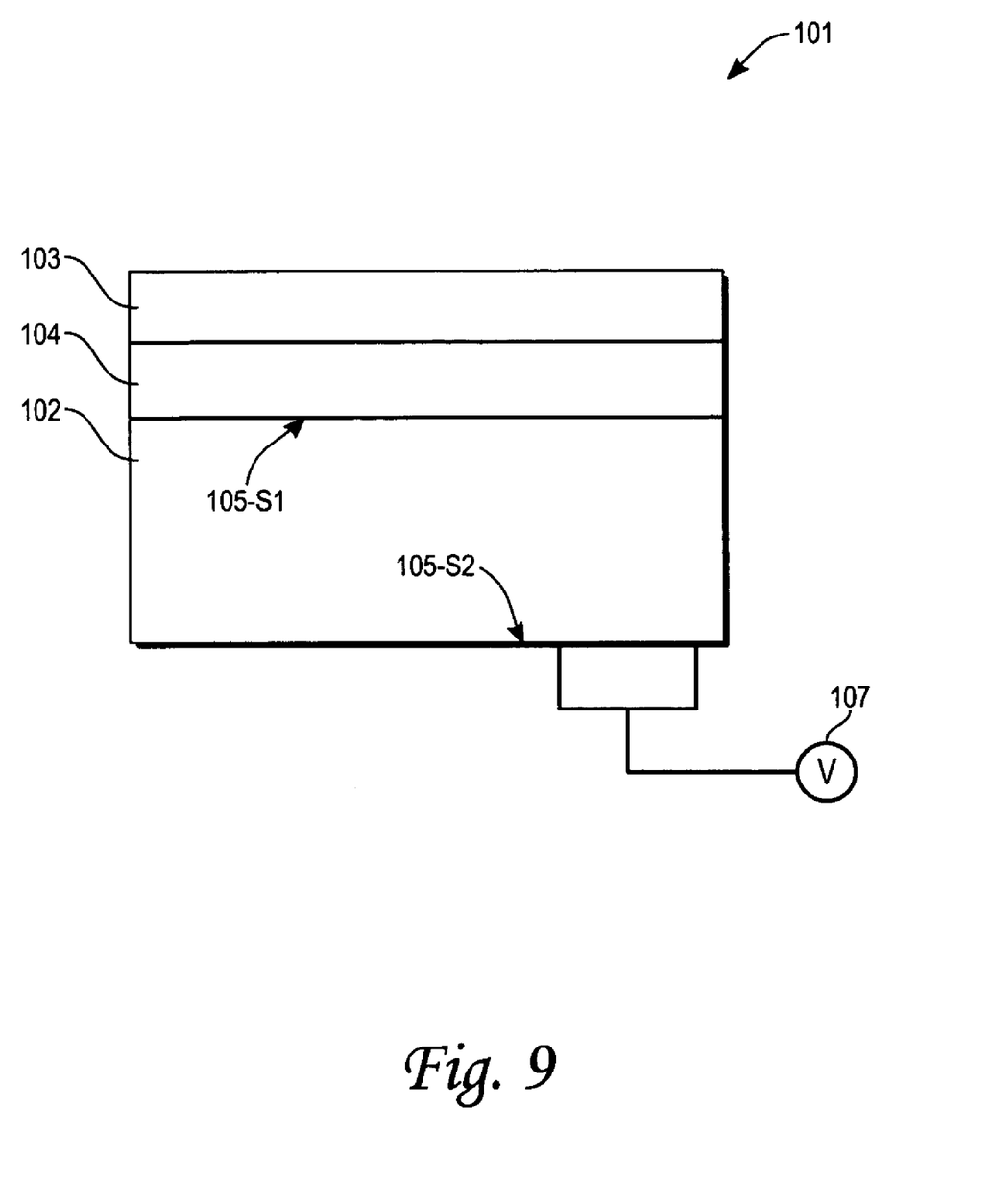
FIG. 9 schematically illustrates apparatus for practicing the invention.

FIG. 9 schematically illustrates apparatus 101 for practicing the invention. A substrate 102, having a catalyst layer 103 and preferably having an underlayer 104 on a coating surface 105-S1, is provided. A single electrode 106 and associated voltage source 107 (0.1-100 Volts) is connected to the coated surface 105-S1 or, preferably, to a second substrate surface 105-S2 that is spaced apart from the coated surface, for a voltage application time interval of selected length 1-100 sec, or longer if desired. More than one electrode, each connected to the voltage source 107, can be connected to the substrate 102. After completion of the voltage application time interval, the electrode is optionally disconnected from the substrate 102, or the electrode may continue to be connected to the substrate. An array of two or more CNTs is then grown on part or all of the coated surface 105-S1 of the substrate, and the CNTs thus grown will have substantially the same orientation (approximately perpendicular to a plane of the coated surface 105-S1).

Figure 10:
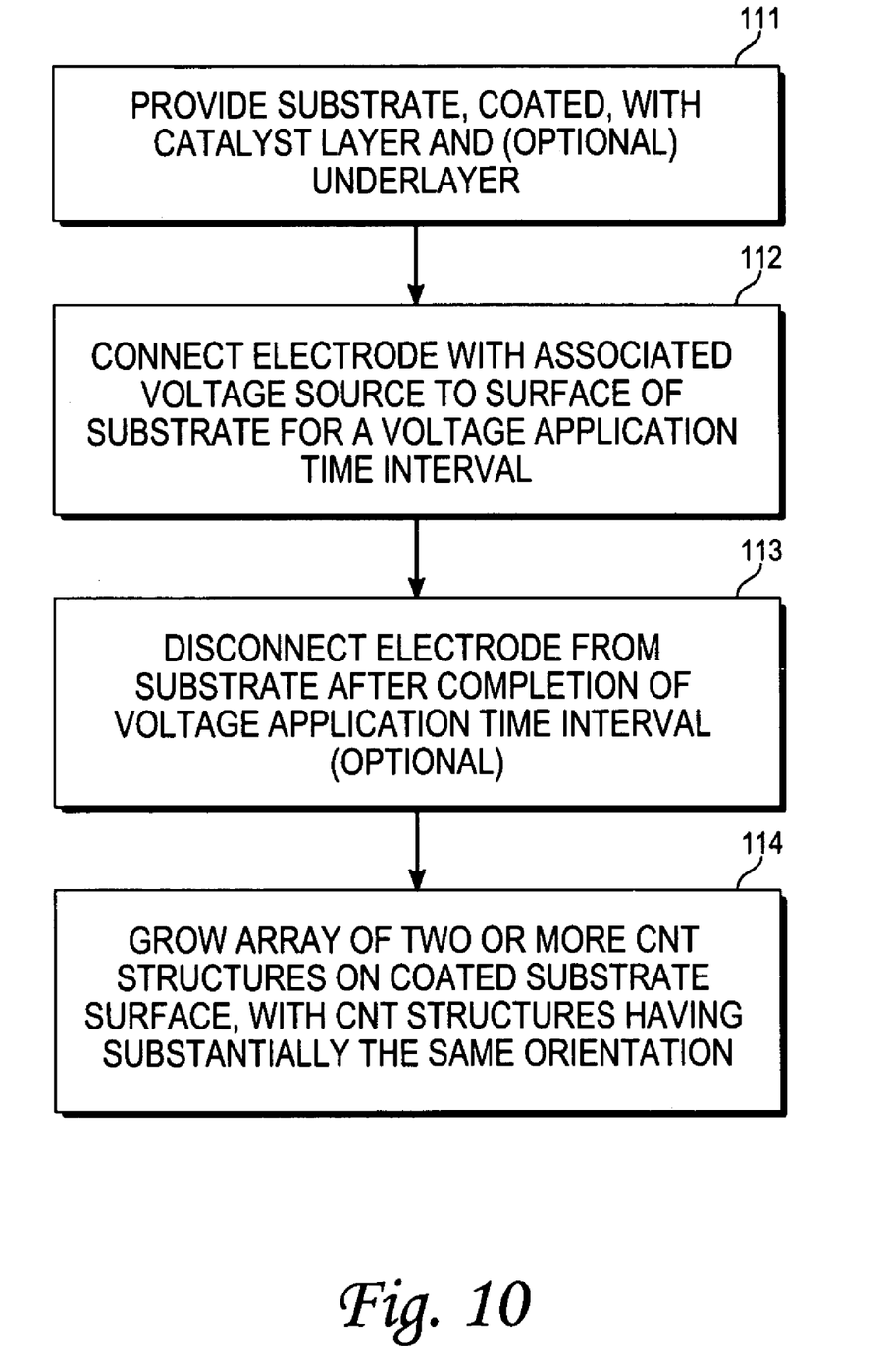
FIG. 10 is a flow chart of a procedure for practicing the invention.

FIG. 10 is a flow chart for practicing the invention. In step 111, a substrate, having a catalyst layer and preferably having an underlayer on a coating surface, is provided. In step 112, a single electrode with an associated voltage source is connected to the coated surface or to another surface of the substrate, for a voltage application time interval of selected length. In step 113 (optional), the electrode is disconnected from the substrate after completion of the voltage application time interval. In step 114, an array of two or more CNTs is grown on the coated substrate surface, and the CNTs thus grown are aligned in substantially the same direction.

What is claimed is:

1. A method of fabricating an array of carbon nanotubes ("CNTs") that are oriented in substantially the same direction, the method comprising:
   providing a substrate of a selected material having a first substrate surface in a heated chamber, a first layer of a first selected thickness of material including at least one of a first group of materials consisting of Al and Ir, deposited on the first substrate surface, and a second layer of a second selected thickness of material, drawn from a second group of materials including at least one of Fe, Co, Ni and Mo, deposited on the first layer, to form a coated substrate surface;
   connecting a single electrode having a selected voltage that lies in a range of about 0.1-100 Volts to at least one of the first substrate surface and a second substrate surface, where no additional electrode is located adjacent to the single electrode, and where an electrical field outside and adjacent to the first substrate surface and the second substrate surface has approximately zero field intensity;
   providing a hydrocarbon-containing ("HC-containing") gas containing at least one of $CH_4$, $C_2H_4$ and $C_2H_2$, heated to a selected temperature in a range between 400° C. and 1000° C. within the chamber, and passing the HC-containing gas over a selected portion of the coated substrate surface; and
   allowing at least one layer deposited on the coated substrate surface to remove H atoms and molecules from the HC-containing gas and to deposit carbon particles as part of an array of structures, including at least one of a single wall CNT, a multi-wall CNT and a carbon-based nanofiber ("CNF"), on the coated substrate surface, whereby the structures are oriented in substantially the same direction, approximately perpendicular to the first substrate surface.

2. The method of claim 1, further comprising:
   providing, as said HC-containing gas, a gas that is primarily $CH_4$, heated to a selected temperature in a range $800° C. \leq T \leq 1100° C.$, and
   allowing said first and second layers deposited on said coated substrate surface to remove said H atoms and molecules and to deposit said carbon particles to form at least two single wall CNTs on said coated substrate surface, in said array.

3. The method of claim 1, further comprising producing at least one single wall nanotube having a diameter in a range between 0.5 nm and 5 nm.

4. The method of claim 1, further comprising:
   providing, as said HC-containing gas, a gas that is primarily at least one of $C_2H_4$ and $C_2H_2$, heated to a selected temperature in a range $650° C. \leq T \leq 900° C.$, and
   allowing said coated substrate surface to remove said H atoms and molecules and to deposit said carbon particles to form at least two multi-wall CNTs on said coated substrate surface, in said array.

5. The method of claim 1, further comprising producing at least one multi-wall nanotube having a diameter in a range between 2 nm and 100 nm.

6. The method of claim 1, further comprising producing at least one nanofiber having a diameter in a range between 5 nm and 200 nm.

7. The method of claim 1, further comprising providing said second layer with said second selected thickness in a range between 0.1 nm and 20 nm.

8. The method of claim 1, further comprising providing said second layer primarily by sputtering of a target containing at least one of Fe, Co, Ni, Mo and Pd.

9. The method of claim 1, further comprising providing said second layer primarily by sputtering of a target containing at least two of Fe, Co, Ni, Mo and Pd.

10. The method of claim 1, further comprising providing said first layer with said first selected thickness in a range between 0.1 nm and 20 nm.

11. The method of claim 1, further comprising providing said first substrate surface deposit primarily by at least one of ion beam sputtering, arc discharge, laser ablation, chemical vapor deposition and evaporation of a target containing at least one of Al and Ir.

12. The method of claim 1, further comprising providing said first substrate surface deposit primarily by sputtering of a target containing Al and Ir.

13. The method of claim 1, further comprising selecting said substrate material from a group of substrate materials consisting of Si, porous Si, highly oriented pyrolytic graphite (HOPG), an AFM cantilever, amorphous carbon, fused quartz, glass, zeolite and mica.

14. The method of claim 1, further comprising disconnecting said single electrode from said at least one of said first substrate surface and from said second substrate surface, after said single electrode has been connected to said one of said first substrate surface and said second substrate surface for a voltage application time interval having a length in a range of about 1-100 sec.

15. The method of claim 1, further comprising choosing said second substrate surface to be spaced apart from said first substrate surface.

16. The method of claim 1, further comprising providing said first layer by a process comprising at least one of ion beam sputtering, arc discharge, laser ablation, chemical vapor deposition and evaporation of a target containing at least one of Al and Ir.

17. The method of claim 1, further comprising providing said first layer by a process comprising sputtering of a target containing Al and Ir.

18. The method of claim 1, further comprising choosing said selected voltage range to be 0.1-100 Volts.

19. The method of claim 1, further comprising connecting said single electrode to a coil.

* * * * *